United States Patent [19]
Caldwell et al.

[11] Patent Number: 5,465,085
[45] Date of Patent: Nov. 7, 1995

[54] RETAIL STORE DISPLAY SYSTEM

[75] Inventors: Michael W. Caldwell, San Jose, Calif.; Hendrik Blankenstein, Sandy, Utah

[73] Assignee: Display Network, Inc., San Jose, Calif.

[21] Appl. No.: 198,647

[22] Filed: Feb. 22, 1994

Related U.S. Application Data

[63] Continuation of Ser. No. 836,070, Feb. 13, 1992, abandoned.

[51] Int. Cl.$^6$ ............................ G06F 15/16; G09G 3/00
[52] U.S. Cl. ................ 340/825.35; 235/383; 340/825.15
[58] Field of Search ........................ 340/825.35, 825.06, 340/825.07, 825.15; 235/383, 385, 462, 472

[56] References Cited

U.S. PATENT DOCUMENTS

| | | | |
|---|---|---|---|
| 4,002,886 | 1/1977 | Sundelin . | |
| 4,139,149 | 2/1979 | Crepeau et al. | 235/383 |
| 4,438,432 | 3/1984 | Hercum | 340/825.35 |
| 4,500,880 | 2/1985 | Gomersall et al. | 340/825.35 |
| 4,521,677 | 6/1985 | Sarwin | 235/385 |
| 4,654,514 | 3/1987 | Watson et al. | 235/385 |
| 4,766,295 | 8/1988 | Davis et al. | 235/383 |
| 4,879,756 | 11/1989 | Stevens et al. | 340/825.54 |
| 4,888,709 | 12/1989 | Revesz et al. | 364/518 |
| 4,937,586 | 6/1990 | Stevens et al. | 343/702 |
| 5,019,811 | 5/1991 | Olson et al. | 340/825.17 |
| 5,089,813 | 2/1992 | De Luca et al. | 340/825.44 |
| 5,111,196 | 5/1992 | Hunt | 340/825.35 |
| 5,198,644 | 3/1993 | Pfeiffer et al. | 235/383 |
| 5,202,923 | 4/1993 | Kuriyama | 380/50 |

FOREIGN PATENT DOCUMENTS

WO66773   9/1988   WIPO ................ G07G 1/14

*Primary Examiner*—Donald J. Yusko
*Assistant Examiner*—Edward Merz
*Attorney, Agent, or Firm*—Roger S. Borovoy

[57] ABSTRACT

A system for electronically displaying item data available in updatable form from a computer, such as item prices, for purchaser viewing. The system provides an infrared encoded signal containing item data applicable to an item on a shelf associated with an electronic display unit. The electronic display unit receives, decodes and displays the data relating to the item. The display units include a display for displaying the data; a photovoltaic cell for providing all necessary power without need for any other external or internal power source; a controller; and a non-volatile, semiconductor memory powered by the photovoltaic cell for retaining the data even in the absence of light energy being applied to the photovoltaic cell. Upon receiving the encoded signal, the display unit determines that the infrared encoded signal is intended for it, and if so, it prepares and displays the data.

4 Claims, 13 Drawing Sheets

RETAIL STORE DISPLAY SYSTEM

This is a continuation of application Ser. No. 07/836.070, filed Feb. 13, 1992, now abandoned.

BACKGROUND AND PRIOR ART

Bar code technology is having a profound influence on today's retail merchandising industry. It has been driven primarily by two needs of the retailer: reduction of operational costs and improved inventory control at both local store and central distribution levels. There has been a long-felt need for an accurate and cost-effective method to automatically display the price of a bar-coded product on the shelf, which can be continually computer updated but which doesn't interfere with normal store operations.

Many prior art solutions have been offered. They have been as simple as a hard-wired network of displays (see U.S. Pat. Nos. 4,002,886; 4,139,149; 4,438,432; 4,500,880; and 4,521,677). Such designs suffer from reliability problems, are inflexible and their installation is expensive.

Other solutions have used a radio broadcast medium rather than wire for at least part of the communications link between the POS computer and the display shelf (U.S. Pat. No. 4,879,756). Other media have included infrared (U.S. Pat. No. 4,766,295). In all cases, the display device itself has been powered by battery, by hard-wired power or by a combination of both.

In the case of hard-wired power, the same cable may contain both the power wires and the signal wires used to control the display. To accommodate the needed wires, an extra channel is attached to the shelf edge. This increases the shelf size, making the display more susceptible to damage. It also creates operational risks in that many liquids in a store are conductive. Thus a spill can create a short circuit and hence cause a system failure. This arrangement also is inflexible because the electronic displays may only be used where the extra channel is installed and power is available. Finally, these installations are expensive.

Battery-powered solutions offer more operational flexibility because displays may be more randomly placed. However, batteries must periodically be replaced, an objectionable and time-consuming task in a store that may have tens of thousands of displays. Being wireless, the battery-powered units use light or radio waves as the medium for communicating the data from the computer to the shelf. Where radio waves are used, an FCC license must be obtained for each installation, causing delays in installation. In addition, frequency allocations are becoming difficult to obtain.

BRIEF DESCRIPTION OF THE INVENTION

This invention provides a system which overcomes the problems associated with the prior art techniques. It combines the flexibility and privacy of digital data transmission via infrared light with the convenience, flexibility and economy of batteryless electrical power collected from the overhead lighting.

Briefly, the system of the invention is for electronically displaying item data, such as price, for purchaser viewing, wherein the data is available in updatable form from a computer. The system provides an infrared encoded signal containing item data applicable to an item on a shelf which is associated with an electronic display unit. The electronic display unit receives, decodes and displays the data relating to the item with which the display unit is associated. The display units of the invention include a display for displaying the data; a photovoltaic cell coupled to the display unit for providing all necessary power without any other external or internal power source; and a nonvolatile, semiconductor memory powered by the photovoltaic cell for retaining the data even in the absence of light energy being applied to the photovoltaic cell.

Upon receiving the encoded signal, a display unit determines that the infrared encoded signal is intended for itself and if so, prepares the data for display and displays the data. In a preferred embodiment of the invention, the light energy is supplied by room lighting.

Infrared transmission has frequently been used for sending digital data to electronic appliances, such as televisions, video cassette recorders and compact disc players. However in consumer electronics, the receiver/amplifier is normally supplied with ac power or dc power converted from ac by a transformer. This unlimited source of power allows the use of high gain, high current amplifiers for the infrared receiver. The Davis patent U.S. Pat. No. (4,766,295), for example, describes a display system powered by standard batteries or wired directly to a power supply (Col. 6, lines 48–50). Either of these power sources provides steady, relatively high power for the amplifier.

Solar cells have been used in many well-known applications in lieu of battery power. The use of solar cell power, however, has been limited to display-only devices with a small amount of digital logic requiring little power, such as watches and calculators. One prior art data display system (PCT Publication No. WO 90/13067; PCT/AU90/00150) transmits the data by modulating room lighting. That system powers the shelf pricing labels with solar cells which have battery back-up to provide sufficient power in the absence of sufficient room light. Like the battery-powered shelf labels, the rechargeable Nicad batteries in these battery back-up systems also must be replaced regularly to insure reliability. Nicad batteries have "memory" problems which frequently cause failures. If the battery is sealed in the display unit, the entire unit must be replaced. Moreover, these back-up batteries commonly will last in the absence of light only up to about 48 hours. In the event of no light for a longer period (remodeling, power outage, etc.), the batteries often need to be replaced and all stored data reprogrammed. Even if the batteries will recharge with the restored solar power, each label will then have to be reprogrammed. Accordingly, these systems have the same disadvantage, although not quite as severe, as the non-rechargeable battery-powered systems.

Accordingly, for use in the system of the invention, a display module has been invented which adequately amplifies a low power signal, processes the data and controls the display and yet is powered by an inexpensive solar cell without need for battery back-up. Moreover, the module of the invention is small enough to fit into an industry standard shelf edge channel. By not protruding from the shelf, the display unit is protected from damage. Additionally, installation is less expensive since no extra channel must be added to the existing shelf.

The invention is described in its primary application in a retail store. However, it may be used more generally to distribute and display information of any kind in any environment where batteryless and wireless operation is desirable. Examples include panel meters (digital or analog type display) in a manufacturing or power generation environment, where hard wiring is undesirable or difficult; the display of inventory level at warehouse bins; and silent paging of personnel using a device worn on the body or suspended from the ceiling. Electronic display signs using the invention may be located over store aisles in a supermarket, for example, to announce what products are stored on that aisle, and may be updated with graphic or animated advertising information.

DETAILED DESCRIPTION OF A PREFERRED EMBODIMENT OF THE INVENTION

The display system of the invention allows real time control of displayed price and other information of interest to consumers or of importance to store personnel. For ease of understanding, a retail store application will be described. Obviously, this is but one of many applications of the display system of the invention. The displayed price information is desirably linked to the checkstand pricing database for accuracy. This database is contained in the point-of-sale (POS) computer used for checkout using conventional barcode laser scanning. If desired, the database could be contained in a separate computer from the POS computer.

Being computer based, such a system implements price or other database changes so quickly and conveniently that prices may be changed, if desired, many times each day. Such flexibility allows pricing strategy to be based upon weekly, daily or even hourly buying patterns, rapid response to competitors' advertisements, store inventory levels, precisely timed, intraday sales opportunity windows, last minute manager decisions or other scenarios. The system also permits control of in-store shelf display of prices from a central, remote location.

Figure 1:
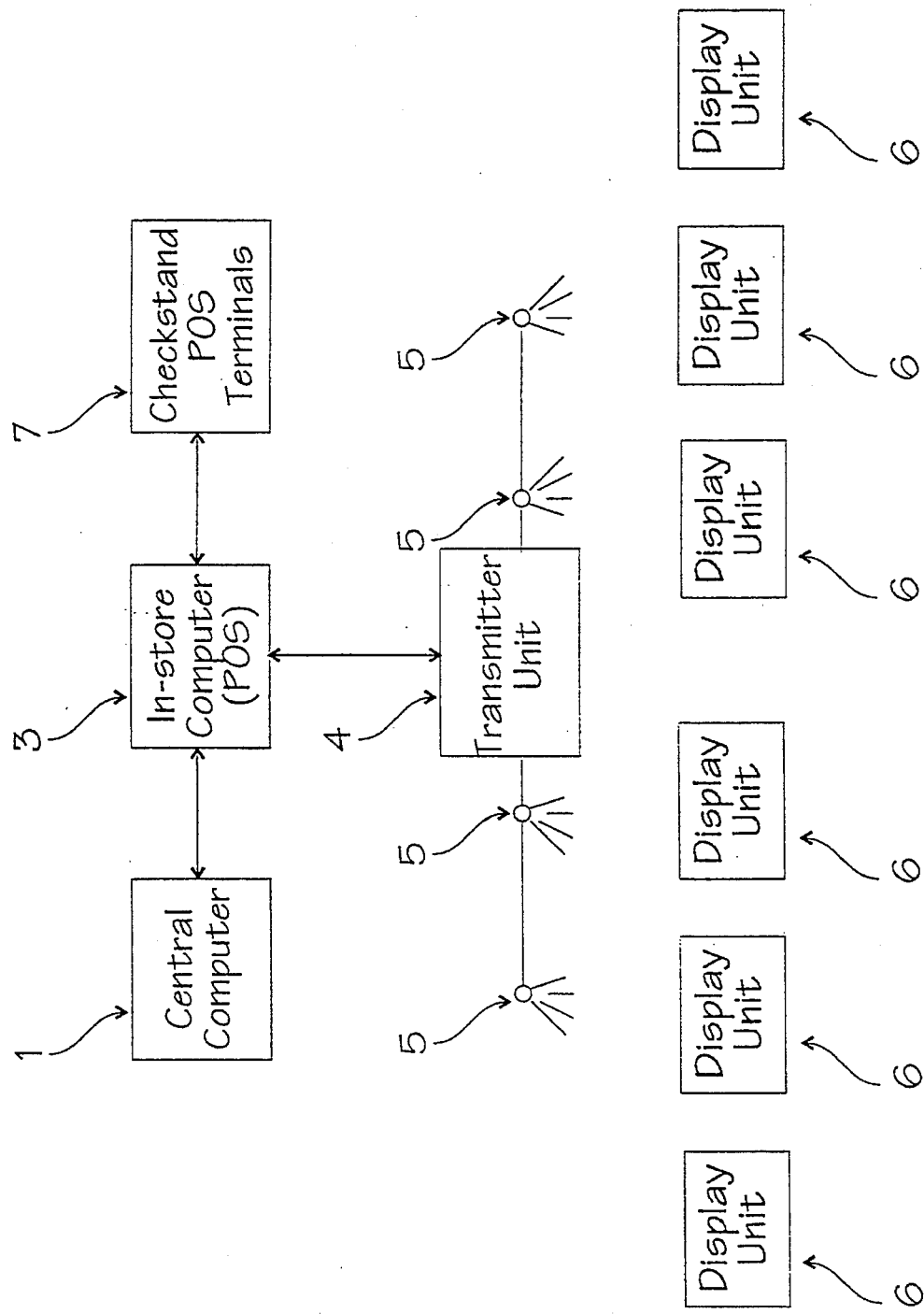
FIG. 1 is a block diagram of the system of the invention.

The system of the invention shown in FIG. 1 is made up of three main subsystems: an in-store computer 3; a transmitter unit 4 that sends electrical pulses through wiring to a plurality of overhead infrared (IRED) emitters 5; and a plurality of display units 6 that each receives the data from the computer, determines if the data contains the address of that individual unit, and responds accordingly. The basic pricing data may, if desired, be supplied by a central computer 1. Each of these subsystems will be further described below.

THE IN-STORE COMPUTER

Figure 2:
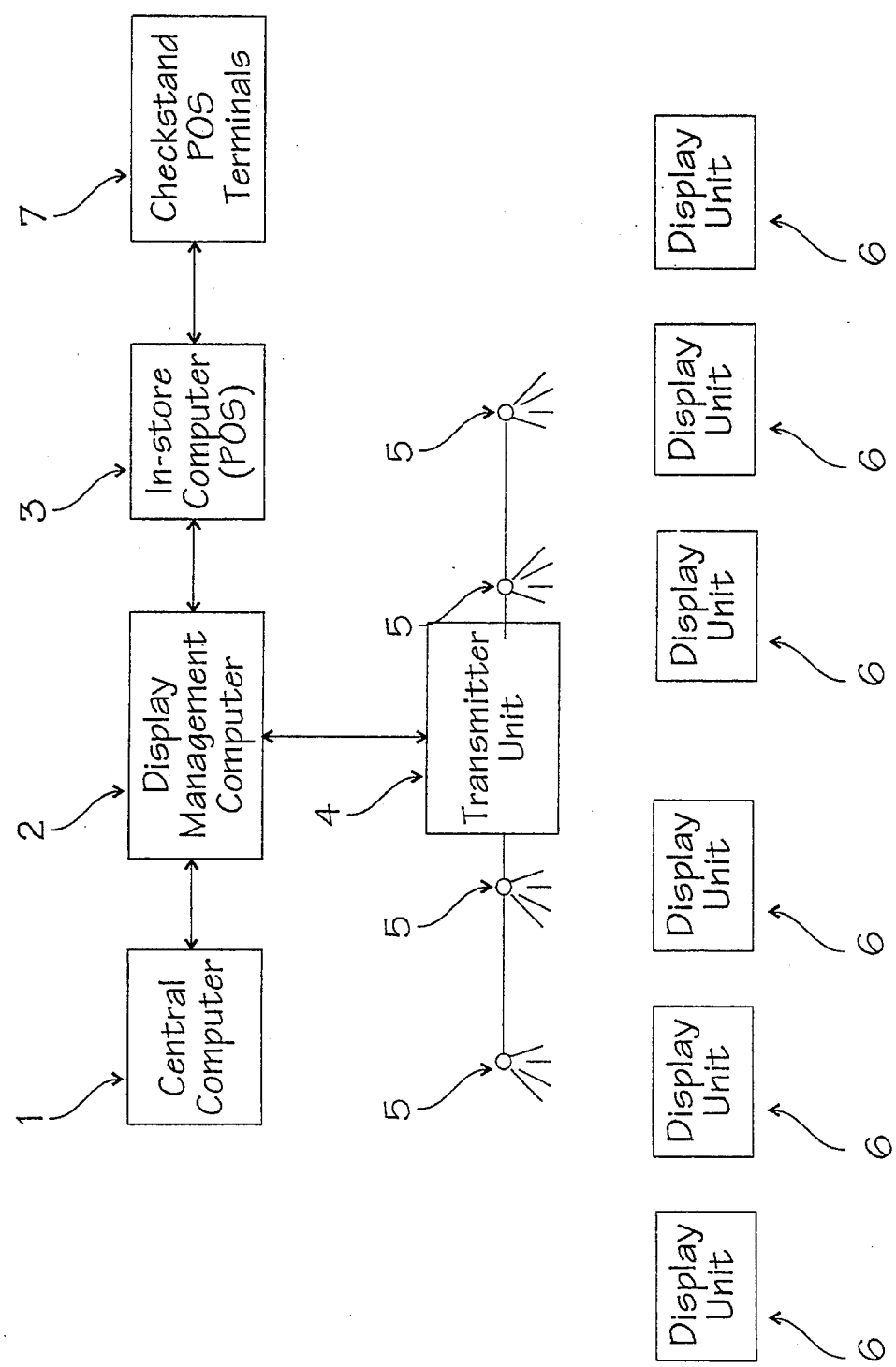
FIG. 2 is a block diagram of the system of a preferred embodiment of the invention.

Referring to FIGS. 1 and 2, the system of the invention is shown which handles the flow of price information in a store. Preferably, all aspects of the checkout pricing and display are controlled in software by the POS computer 3. Thus, the display system of the invention is interfaced to a POS computer that is capable of supporting all aspects of the display system. The POS computer shown in FIG. 1 has such an interface.

However, by industry practice, each brand of POS computer 3 has its own software which is incompatible with other brands. This software is updated from time to time with revisions supplied by the POS system vendor that can make considerable differences to system operation. In the preferred embodiment of the invention shown in FIG. 2, an additional computer, called a display management computer 2, is employed. Computer 2 receives the data from the central computer 1 via phone modem, satellite, floppy disk, manual entry or other network connection. After computer 2 responds to the received data, such as by changing the displayed data on the shelf display units, the data is then released to the POS computer 3. Preferably display computer 2 receives price data in a standard format which enables it to determine the actions to be taken. After completing those actions, including changing the data to be displayed on the display units if needed, computer 2 passes the data to POS computer 3, preferably in the same format.

Using a standardized data format and the additional display management computer 2 eliminates the problems associated with the software and hardware differences between the display system of the invention and various available POS systems, allowing store owners to use their existing POS computers even if such POS computers do not support the display system of the invention directly. In this preferred embodiment shown in FIG. 2, transmitter unit 4 is connected to display computer 2 instead of directly to POS computer 3, as was the case in the embodiment of FIG. 1. Alternatively, POS computer 3 may be located between the central computer 1 and display management computer 2, if desired, taking its display commands from POS computer 3.

THE TRANSMITTER UNIT

Still referring to FIG. 2, at the time of transmission of pricing information to the display units 6, computer 2 or computer 3 (in the embodiment of FIG. 1) formats the pricing data in a form recognized by display units 6. Such data is then sent to transmitter unit 4. The software used to transmit the data may cause the data to be repeated several times to improve the odds of the data being successfully received. This guards against a particular infrared data transmission being blocked by traffic, a cart or other temporary obstacle. Infrared transmitters of the type used in the system of this invention are well known in the art. A global command common to all of display units 6 is sent to all display units 6 along with the data required to display their new price or other transmitted information. Transmitter unit 4 is connected to computer 2 or computer 3 (in the embodiment of FIG. 1) by any conventional serial or parallel data connection.

One preferred operational method of the invention is to continuously display the current price while continually broadcasting a new price, even if no change to the display is immediately required. This new price is not displayed, but rather saved for later use. Each unit is addressed uniquely. Then when the new prices are to take effect, a global command is sent which causes all the new prices to be displayed.

Transmitter unit 4 may also be an add-in board for the computer itself, connected directly to the bus, eliminating the need for any cable. Transmitter unit 4 includes memory that stores the data and logic and may include the firmware used to send the data serially to the infrared light emitting diodes (IREDs) 5. The signals for the actual transmitted pulses may be developed by circuitry in transmitter 4 or may be sent from computer 2. If computer 2 is used, the pulses may be sent across a serial or parallel link, using wire, radio or fiber-optic cable. The output stage of transmitter unit 4 is a driver with the power to deliver an aggregate of several watts of electrical power to the plurality of IREDs 5 located at selected places near the ceiling of the store. Only about 20–100 mw is needed for any individual IRED. IREDs 5 may be placed over each aisle, aimed towards the shelf edges of the open aisles on each side, which contain the display units 6 of the invention, in an arrangement providing transmission patterns which overlap and cover a broad area.

DISPLAY UNITS

Display units 6 detect the incoming IRED signal from the IREDs 5. The serial information received must include an address and a command, and many contain other optional data. Each of the display units 6 is provided with a unique address which is stored in the memory of the display unit prior to installation. A transmitted message normally contains data in one field and the address of the display unit in another. The address field is compared by the controller contained in the display unit, to be described later, with the address stored in each display unit 6 to determine if that individual display unit has been addressed by the transmitted message. In addition, there is a global address to which all display units will respond. This allows the receipt of messages which are intended for all units.

Figure 11B:
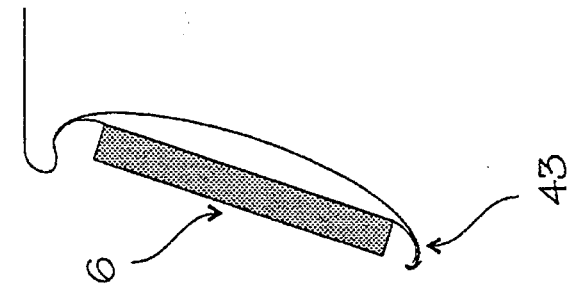
FIGS. 11A and 11B are front and side views, respectively, of a display unit of the invention.
Figure 11A:
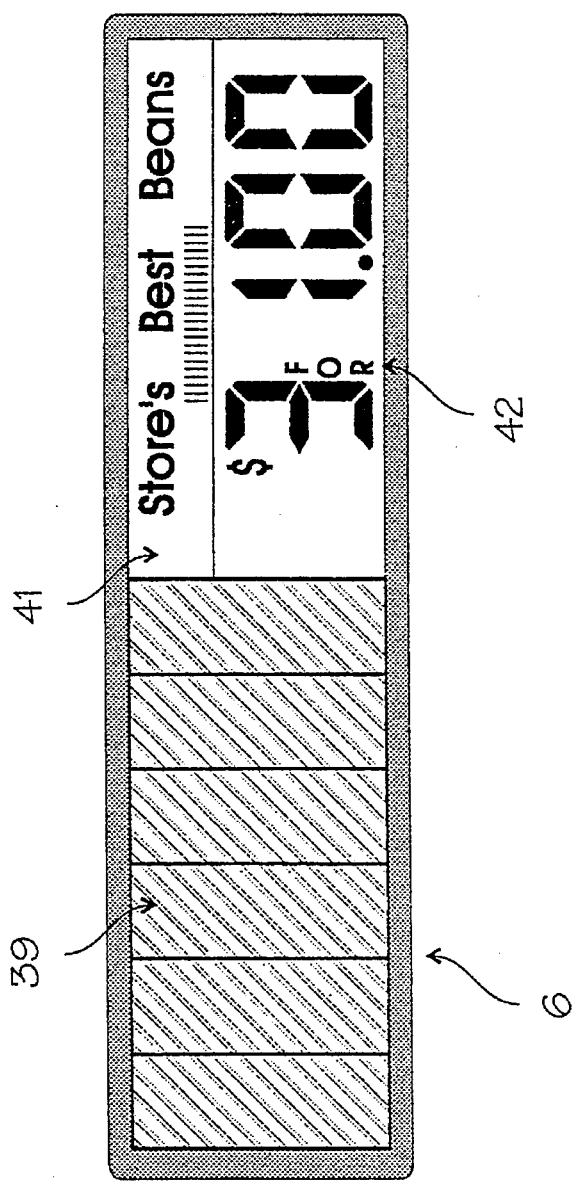

The system designer may arbitrarily devise a set of commands for the display units. The only requirement is that the computer be programmed to send out commands which the display units 6 are programmed to respond to. Examples of typical commands are: change displayed price; calculate new unit price; store new price for later use; and turn on or off custom display enunciators. Referring to FIGS. 11A and 11B, the display units 6 use commercially available components, including the solar cell panel 39, liquid crystal display 42 and a removable sticker 41 for displaying permanent information. LCD 42 shows the price. Descriptive information regarding the product may be shown on the removable sticker 41. The display units 6 preferably are small enough to fit into the standard concave rolled edge of steel shelving 43 shown in FIG. 11B, typically used in supermarkets and other retail stores.

OPERATION MESSAGE TRANSMISSION

The individual bits of the message signal transmitted to the display units are formed by turning an approximately 10 kHz carrier signal on and off. A higher carrier frequency may be used, but typical amplifiers lose gain at higher frequencies. With the low power levels available at the solar powered display units, it is difficult to obtain adequate amplifier gain, so a lower carrier frequency is preferred.

Figure 3:
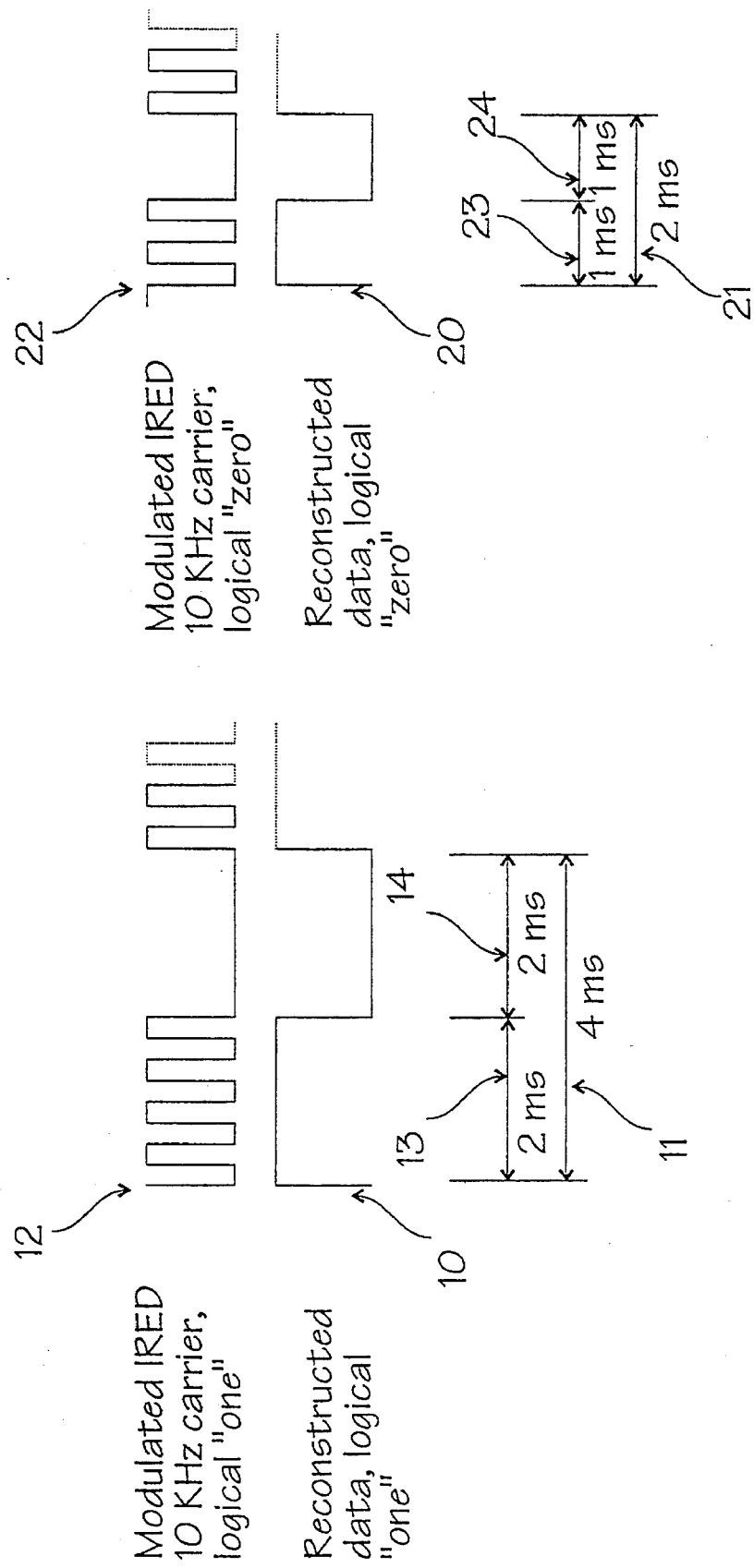
FIG. 3 is a graphical depiction of the modulation and timing signals used to transmit the data in the system of the invention.
Figure 4:
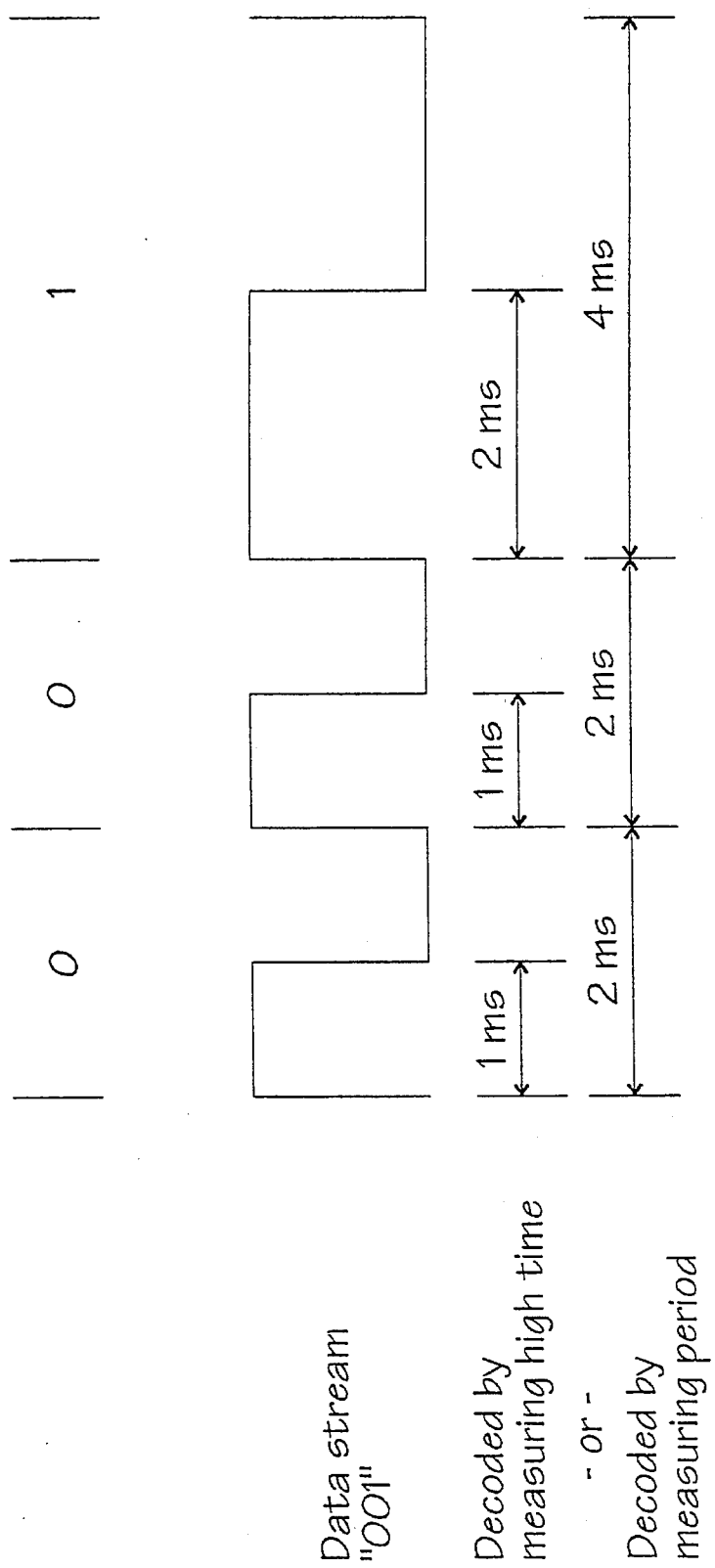
FIG. 4 is a graphical depiction of an example of the data pulses prior to modulation used to transmit data in the system of the invention.
Figure 5:
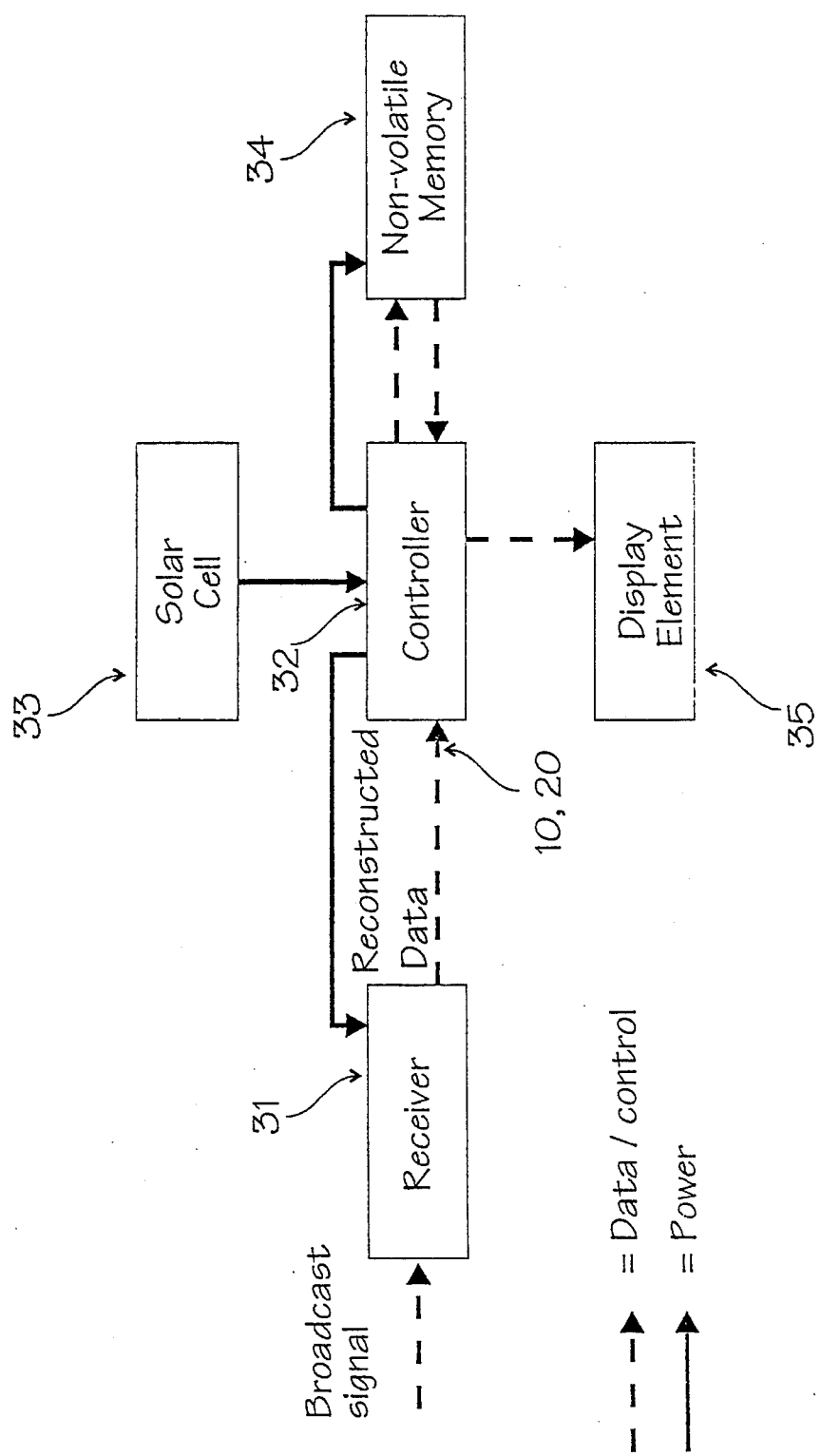
FIG. 5 is a block diagram of the remote display unit of the invention.

Referring together to FIGS. 3, 4 and 5, an example of a transmission bit protocol is illustrated in FIGS. 3 and 4. Receiver 31 amplifies the signals which are either a "one" or a "zero", shown in FIG. 3, and reconstructs the data into two "bit" times: a long bit time for a "one" 10 and a shorter bit time for a "zero" 20. A "one" data bit 10 is defined as a signal having a period 11 of 4 milliseconds, or a high time 13 of 2 milliseconds. A "zero" data bit 20 is defined as a signal having a period 21 of 2 milliseconds, or a high time 23 of 1 millisecond. These bit periods may be longer or shorter depending upon the characteristics of the programmed controller 32. This period should be chosen to maintain a significant difference, either in period length or high time, which the controller 32 is capable of detecting. Controller 32 may either measure the high times 13,23, the low times 14,24 or may measure the edge-to-edge time periods 11,21.

Messages are broadcast generally throughout the serviced area. Referring to FIG. 5, when a message is received by an individual display unit, controller 32 compares the message address with the one stored in its memory. If they match, the instruction is decoded and appropriate action taken. If not, the rest of the message is disregarded and the display unit awaits the start of the next transmission.

Controller 32 is connected to a commercially available liquid crystal display element 35 which is used to display the data. All of the power required by the display unit is supplied by solar cell 33. The technique used for powering the display units is a very important aspect of this invention. Controller 32 is the only device in the display unit directly powered by solar cell 33. One example of a solar cell used in this invention is the Kyocera ASC-2150-6. Controller 32 in turn selectively powers either receiver 31 or non-volatile memory 34, or neither of them, depending upon the desired activity of the display unit at the time and the amount of power available. Normally, receiver 31 is powered and memory 34 is not. When the available power is marginal, receiver 31 is not powered and only the display 35 is powered to maintain its continuing operation. When solar charging again provides adequate power, receiver 31 is repowered.

When reading from or writing into non-volatile memory 34, receiver 31 is disabled by controller 32 to save power. One type of memory used in a preferred embodiment is the ST93C547 manufactured by SGS-Thomson Microelectronics. A preferred controller is the SMC 6234 made by S-MOS Systems, Inc. When the reading or writing has been completed, memory 34 is disabled and receiver 31 re-activated. Non-volatile memory 34, which can be NVRAM, $E^2$PROM or other non-volatile, writable memory which does not require battery back-up, holds the unique address of the display unit. It may additionally store the most current display data, unit size, number of shelf facings or other desired information to be retained until the display unit is reprogrammed.

Display 35 may be customized with special labels or enunciators, such as "coupon" or "sale", which can be turned on with a single control bit. This tells the customer unique information about the product on the shelf in addition to its price. If desired, when a customer touches an appropriate switch on the display unit, the display may be switched to display the price per unit. Other types of display on the display unit may be devised without departing from the scope of the invention. For example, one low-cost version of a display unit may have only the price without any extra words and use small numbers with only two digits. This would be for groups of small items (priced under a dollar, for example) that would be close together on the shelf. Another version may have a place for an extra digit followed by a slash or the word "for" that would allow group pricing (for example, "three for a dollar" may be displayed as "3/$1.00" or "3 for $1"). The display units may be programmed to display whatever information is desired to provide at the retail shelf, the factory, warehouse, or wherever information is desired to be displayed in the particular application of the system of the invention.

Figure 6:
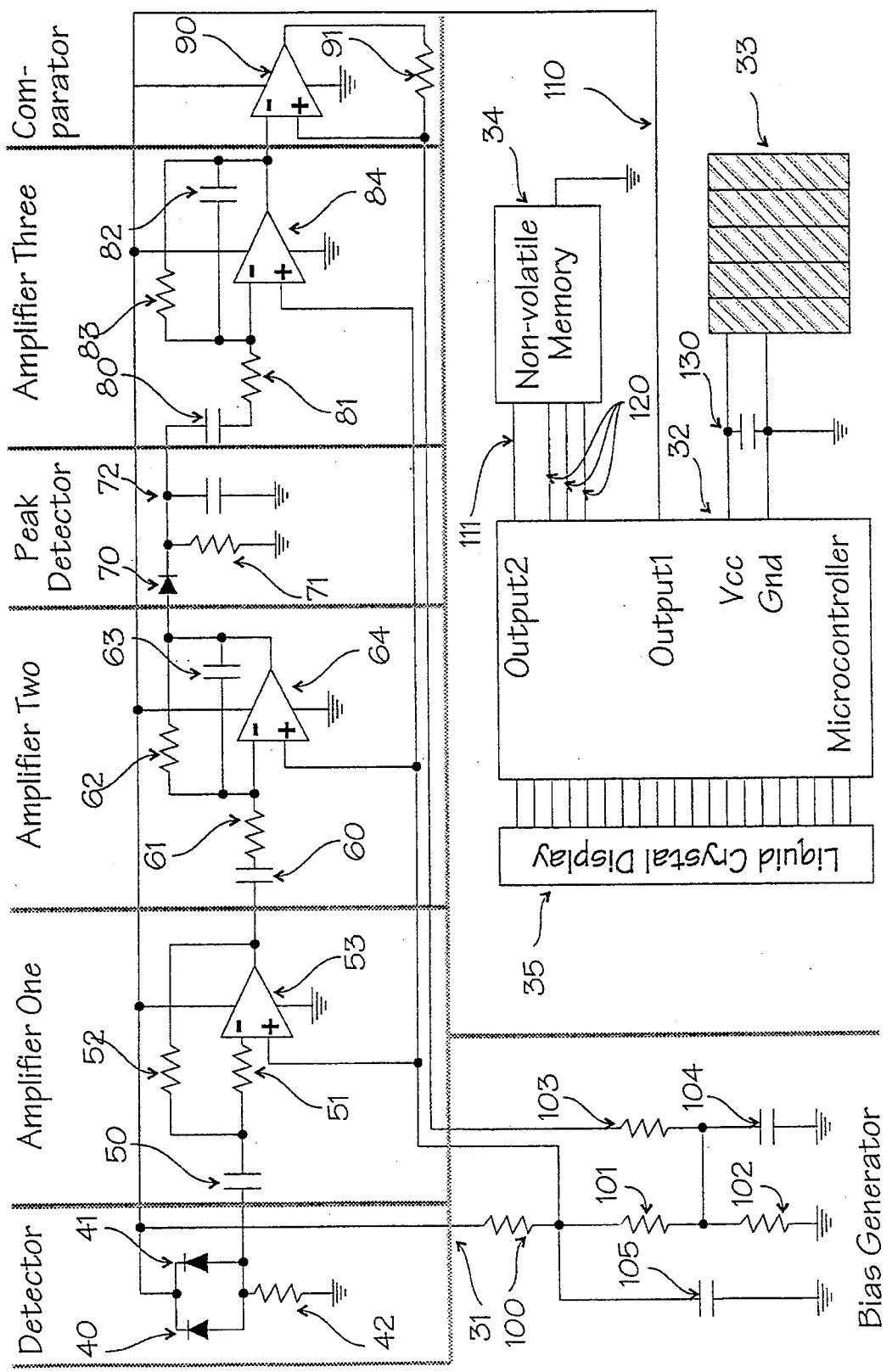
FIG. 6 is partially a block and partially a schematic diagram of the display unit used in the system of the invention.

The display unit of FIG. 5 is shown schematically and in more detail in FIG. 6, which shows the electronics of the receiver 31. Receiver 31 includes a detector, a first amplifier, a second amplifier, a peak detector, a third amplifier, a comparator and a bias generator. In a preferred embodiment, the three amplifiers and the comparator shown are a TLC25L4 made by Texas Instruments, Inc. The display unit shown also incorporates a power supply which includes photovoltaic cell 33 and a power control system which controls power through lines 110 and 111. Line 110 supplies power to the receiver as controlled by controller 32 and line 111 supplies power to the memory as controlled by controller 32. Finally, the display unit shown includes liquid crystal display 35 and non-volatile memory 34. Controllers are available with non-volatile memory, such as $E^2PROMs$, contained on the same chip. As these become available with the power requirement constraints needed in the system of this invention, they may be used.

The receiver 31 has detector PIN diodes 40,41 connected in a reverse bias configuration. Diodes 40,41 are sensitive to infrared light and convert the transmitted infrared light energy into a current proportional to the energy of the incident infrared light. That current flows through resistor 42 (for example 510 Kohms) to convert this current into a voltage. The value of resistor 42 is chosen to be large enough to produce a workable voltage from the transmitted infrared signal, yet small enough that this voltage does not saturate at expected ambient light levels.

THE FIRST AMPLIFIER

The detector is AC coupled to the first amplifier (amplifier one) via capacitor 50 (for example 470 pf) to block DC offsets of the received signal. This prevents these offsets from saturating operational amplifier 53, thus allowing higher gains to be used. The components 50–53 in the first amplifier provide a high-gain, AC-coupled band-pass filter.

Figure 7:
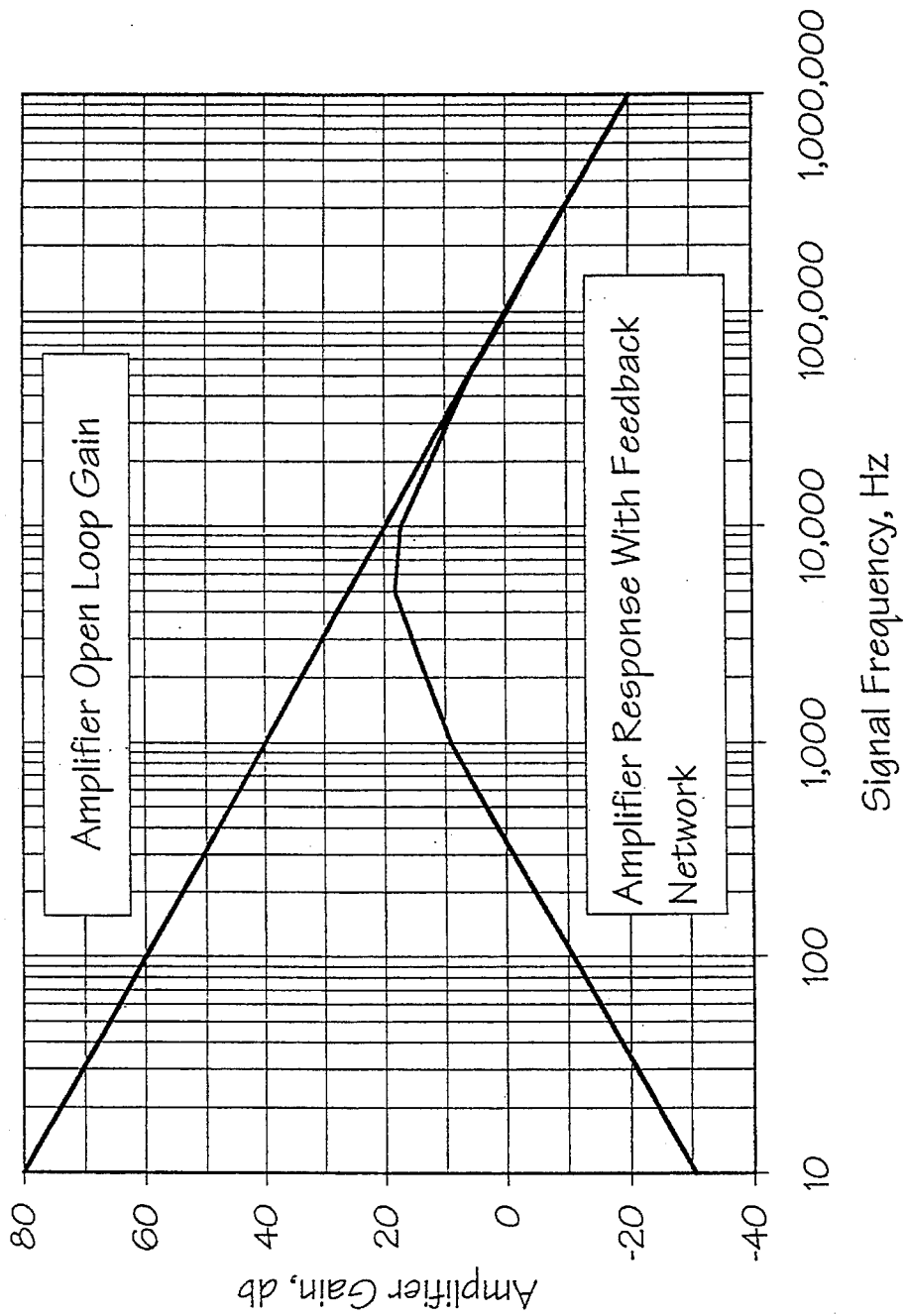
FIGS. 7, 8, 9 and 10 are graphs depicting on a logarithmic scale the amplifier gain versus signal frequency of various amplifier stages used in the system of the invention.

FIG. 7 shows the approximate frequency response characteristics of this first amplification stage. The output of this stage is centered around the bias point. Referring to FIGS. 6 and 7, the high value of the feedback resistors 52 (for example, 1 Mohm) minimizes the loading effect of the feedback network and sets a very high gain for amplifier 53. As can be seen from FIG. 7, the theoretical gain peaks in the 5 to 10 kHz range, but the actual gain is reduced from the response curve because of loading on the output stage.

THE SECOND AMPLIFIER

Figure 8:
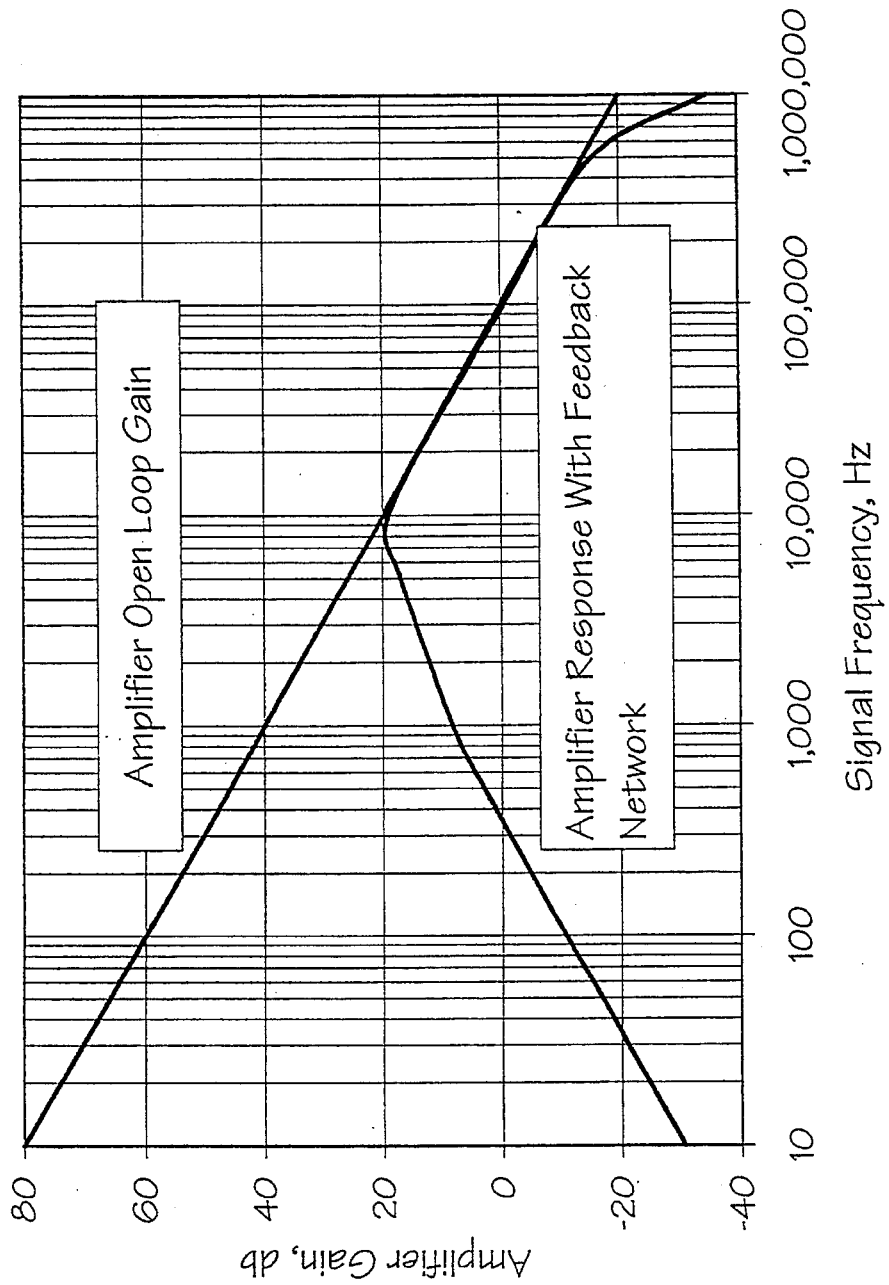

The output of the first amplifier 53 is used as an input to the second stage of amplification (amplifier two) shown in FIG. 6, which is also configured as a high-gain, band-pass filter. Operational amplifier 64, in conjunction with resistors 61 (for example, 4.7 Kohms) and 62 (for example, 1 Mohm) and capacitor 63 (for example, 47 pf) form this filter stage. FIG. 8 shows the theoretical frequency response of this second stage. The gain of this stage peaks in the 7 to 10 kHz range. Like the first stage, this second stage maximizes the gain at about 10 kHz, but also has some filtering of higher frequency components by virtue of feedback capacitor 63. The actual gain of this stage is reduced due to loading on the output of the amplifier. The first and second stages are very similar, except the second stage has a capacitor 63 in its feedback loop for noise reduction. A capacitor is not used for this purpose in the first stage in order to maximize gain.

THE FIRST AND SECOND AMPLIFIERS COMBINED

Figure 9:
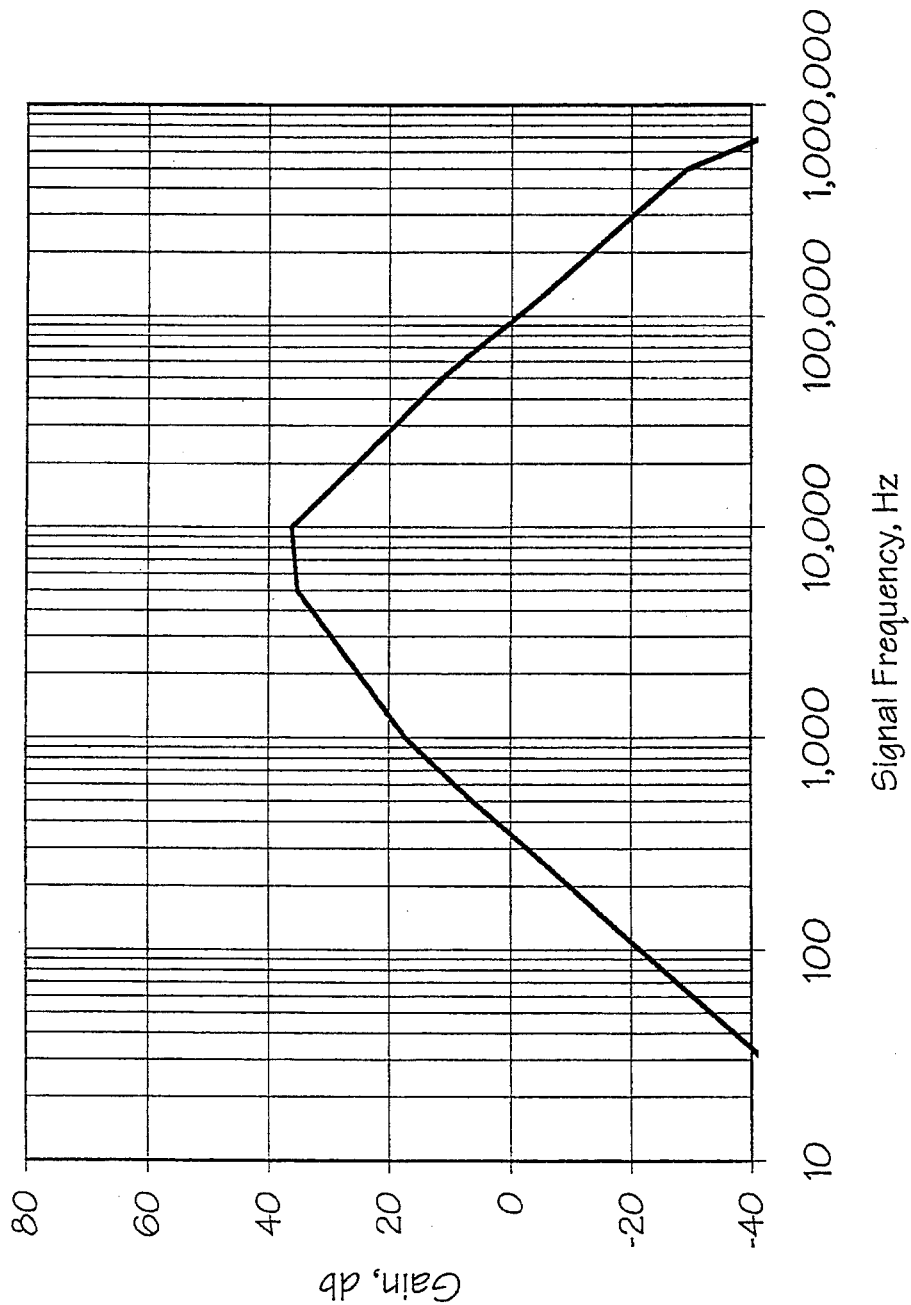

The overall frequency response of the combination of the first two amplifier stages is shown in FIG. 9. The overall theoretical gain at about 10 kHz is approximately 80 dB. The actual gain is somewhat less due to loading on the output stages of the amplifiers and their poor output drive capability. Loading on the amplifiers comes from two sources: the feedback net-works and the input to the next stage. In the illustrated preferred embodiment, the next stage has a greater loading effect than the feedback networks for a given amplifier. The actual gain is less than the theoretical value graphed, but the actual frequency response is the same.

PEAK DETECTOR/CARRIER FILTER

Referring again to FIG. 6, the output of the second amplifier stage is used as the input to a peak detector circuit comprising diode 70, capacitor 72 (for example, 220 pf), and resistor 71 (for example, 3.3 Mohms). The purpose of this detector stage is the reconstruction of the original digital signal from the received modulated signal. Capacitor 72 is charged to the peak of the signal through diode 70, and is discharged through resistor 71 between the signal peaks. The charging rate of capacitor 72 is much faster then its discharge rate, and is limited by the output impedance of operational amplifier 64 and the internal resistance of diode 70 of approximately 10 Kohms, providing a charging time constant of about 4.7 microseconds. The discharge time constant is about 0.7 milliseconds. The output of the peak detector stage is a waveform that approximates the original signal, but is of a lower relative amplitude and an irregular shape.

THE THIRD AMPLIFIER STAGE

Figure 10:
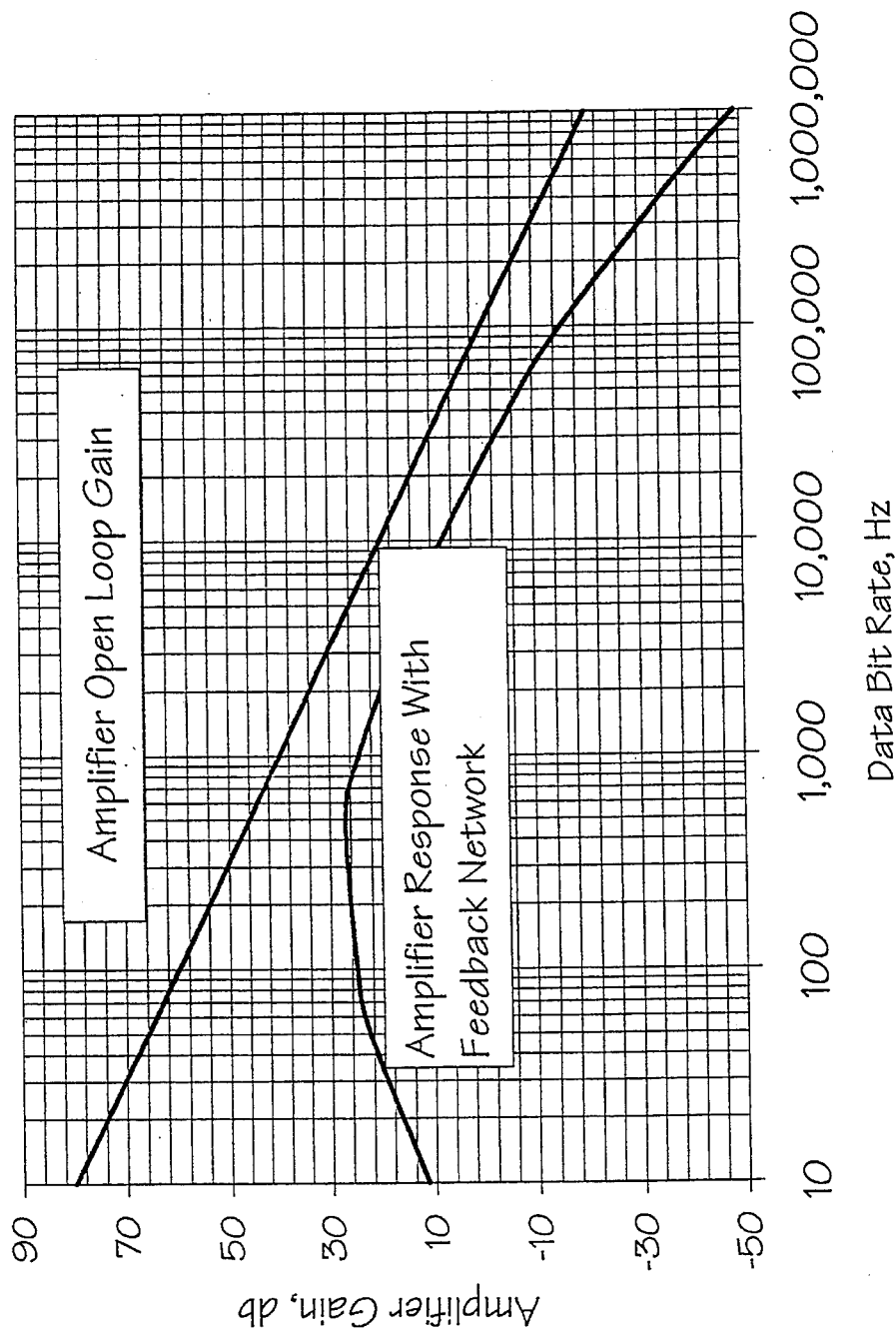

The output of the peak detector stage is used as the input to the third amplifier stage (amplifier three), which is configured as a high-gain band-pass filter with the pass band centered around 300 Hz, which is the approximate frequency of the original digital signal, as shown in FIG. 10. This response curve will amplify the fundamental frequency while reducing the high and low frequency components of the peak detector stage output. The input is capacitively coupled through capacitor 80, (for example, 3300 pf). Amplifier three includes resistors 81 (for example, 390 Kohms) and resistor 83 (for example, 20 Mohms) and capacitor 82 (for example, 10 pf).

THE COMPARATOR

Still referring to FIG. 6, the output of amplifier three is directly input into the inverting input of operational amplifier 90, where it is compared to the bias level supplied to the non-inverting input. The resulting output is a square wave with a time period identical to the original signal shown in FIG. 3. Resistor 91 (for example, 10 Mohms) provides a high level of gain. The output of this stage, previously referred to as the reconstructed data 10,20 (shown in FIG. 3), is routed to a digital input of controller 32.

BIAS GENERATOR

When receiver 31 is energized by microcontroller 32 via supply line 110, the voltage on supply line 110 is divided by a resistor network comprised of resistors 100, 101 and 102, (for example, respectively, 2.2 Mohms, 510 Kohms and 2.2 Mohms). This network generates the bias voltage supplied to the non-inverting inputs of operational amplifiers 53, 64 and 84 of amplifiers one, two and three. This bias voltage has a value slightly above one-half of the voltage supplied by the power supply, and is controlled by the ratio of resistor 100 to the combined resistance of resistors 100, 101 and 102. A second bias level, slightly below one-half of the supply voltage, is generated by the ratio of the combined resistances of resistors 100 and 101 to resistors 100, 101 and 102. This second bias level is supplied to the noninverting input of amplifier 90 through resistor 103 (for example, 100 Kohms). Resistors 103,91 are used in the positive feedback circuit for amplifier 90, as is typical for comparators. The ratio of the resistance of resistor 103 to resistor 91 controls the amount of feedback and provides hysteresis for improved stability and noise immunity. Bypass capacitors 104,105 (for example, 0.047 pf each) on each bias line serve to filter out ground and signal noise.

POWER SUPPLY AND CONTROL

A very important aspect of the invention is its ability to operate with only solar power, eliminating all use of batteries, whether for ongoing power, satisfaction of peak power demands or memory backup. Since light may be absent from time to time, removing solar power, a non-volatile memory is used to store the display unit address and current display data. Additionally, the loss of solar power does not prevent the scheduling of a transmission at any time. Hence the display must constantly be available for reception. Thus, the system of the invention provides continuous operation, including reading and writing from and to a memory device.

Management of the steady state power requirements of the display unit is therefore a part of the invention. This must be viewed from the standpoint of the entire system, not just the display unit alone. Referring to FIG. 6, the factors that interrelate and therefore must be balanced are:

1) DATA RATE: The data rate determines how fast controller 32 must be clocked because controller 32 is software-based and therefore requires sufficient time between bits to execute a certain number of instructions used in the recognition of a logical "one" or "zero." As the bit periods 11,21 (FIG. 3) are reduced, the instruction cycle time of controller 32 must concomitantly be reduced and hence the clock frequency increased.

2) CLOCK FREQUENCY: The power requirements of controller 32 increase directly as clock frequency is increased.

3) MEMORY POWER: Memory 34 consumes the same amount of power whether clocked or not. This power is in excess of that which is available from power supply 33, so some excess power is stored as charge in capacitor 130 when memory 34 is not energized. The longer the time required to read or write the memory, the more power that must be stored in capacitor 130, increasing its size. However, the maximum size of this capacitor is limited both by its physical size and the amount of its dc leakage.

4) SOLAR POWER: Available power is directly proportional to a combination of the incident light level and the surface area of solar cell 33.

Figure 12:
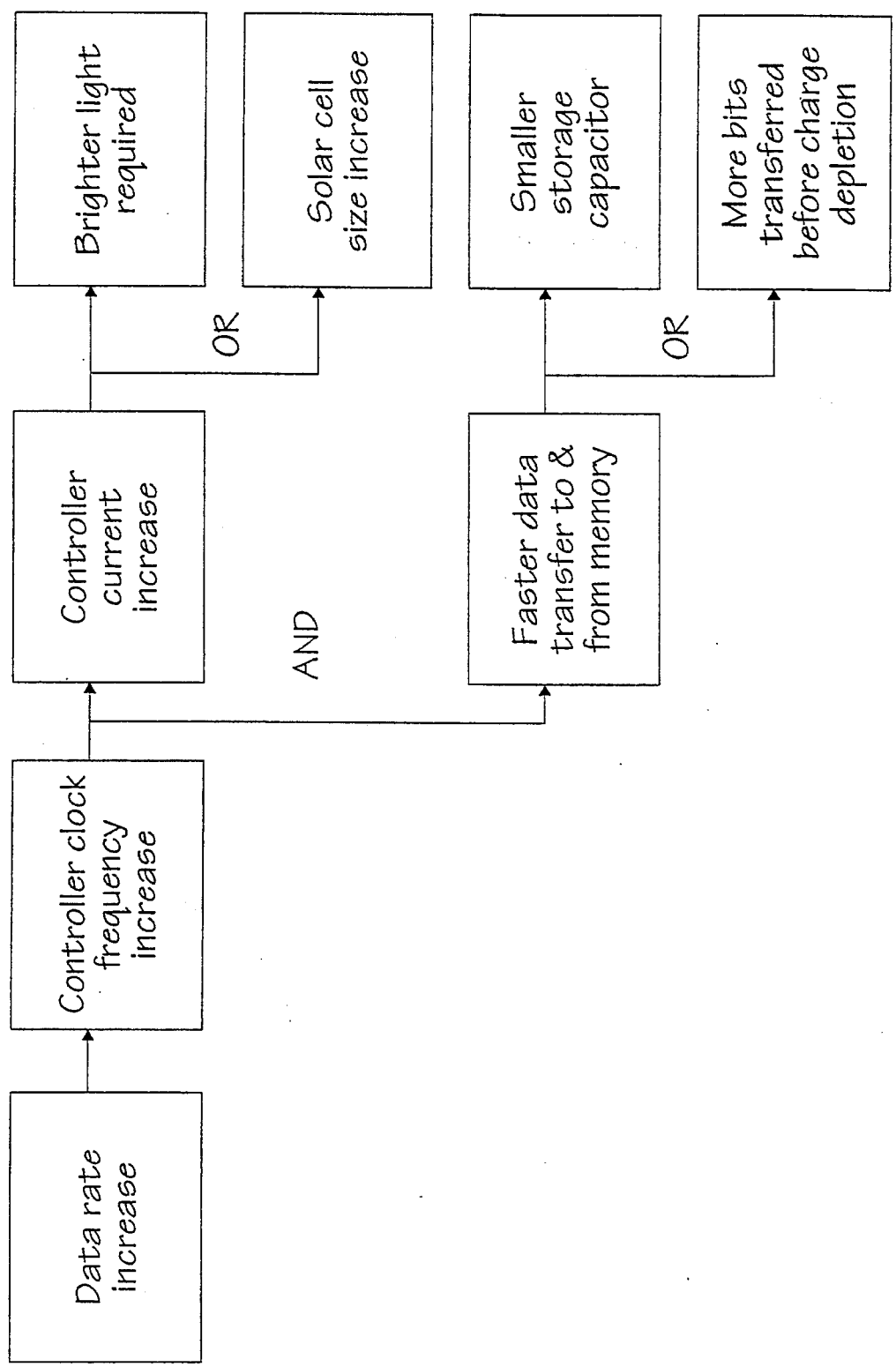
FIG. 12 depicts in block form the relationship between various operating parameters of the display unit of the invention.

The relationship among the above factors is illustrated in FIG. 12. Normally it is possible to increase the data rate to the maximum capability of the controller. However, as FIG. 12 illustrates, the data rate upper limit is defined by the maximum solar cell size and/or the minimum light available. Referring to FIG. 6, thus, the size of solar cell 33 can be reduced (or the minimum required light level specification lowered) by lowering the data rate and hence the clock frequency of controller 32. However, as the clock frequency is lowered, the size and relative leakage of capacitor 130 increases. Ideally, the clock frequency is made fast enough that an entire read or write cycle may be completed before the power stored in capacitor 130 is exhausted. However, such a faster clock frequency would cause controller 32 to consume so much power that the stored charge in capacitor 130 would quickly be depleted. Taking all these considerations into account, most practical capacitors are too small to hold enough charge for a complete read or write cycle. Thus a technique to be described later is used wherein the read/write activity is broken up into shorter actions. This makes the memory power independent of the steady-state power. The design of the power supply for normal operation will be described first.

The final selection of components and parameters will be different with different brands and specifications. Using the preferred embodiment as an example and referring to FIG. 6, the selections of the above-described parameters are made in the following order:

1. The solar cell 33 size is based upon maximum practical size, determined by maximum size which will fit in the display unit, and cost. Its open circuit voltage must be below the maximum for the semiconductor devices used, but should be close to it.

2. The current available from the selected solar cell 33 is determined at the minimum operating voltage of the controller 32 or the receiver 31, whichever is greater. This should be done at the minimum acceptable light level.

3. The current required by the receiver 31 is subtracted from the total current available. Receiver 31 current demand is not a function of clock frequency or data rate.

4. The controller 32 clock frequency is selected so that controller 32 will substantially use up the remaining current during normal, continuous operation.

5. The decoding software is examined to determine the number of controller clock cycles needed to decode "ones" and "zeroes." This may be determined from the documentation of the instruction set for the selected controller.

6. The results of Steps 4 and 5 are multiplied to determine the period of the shortest bit time that will work. For example:

| | |
|---|---|
| Instruction cycle time | = 100 microseconds |
| Instructions required | = 20 |
| Therefore the minimum bit time (period) | = 2.0 milliseconds |

This corresponds to the 2 millisecond period 21 shown in FIG. 3. Some allowance should be made for speed and data rate variations. If the resulting data rate is too slow for the intended purpose, the specified minimum available light level must be raised or the area of solar cell 33 increased, or else a more efficient controller 32 should be selected.

Figure 13:
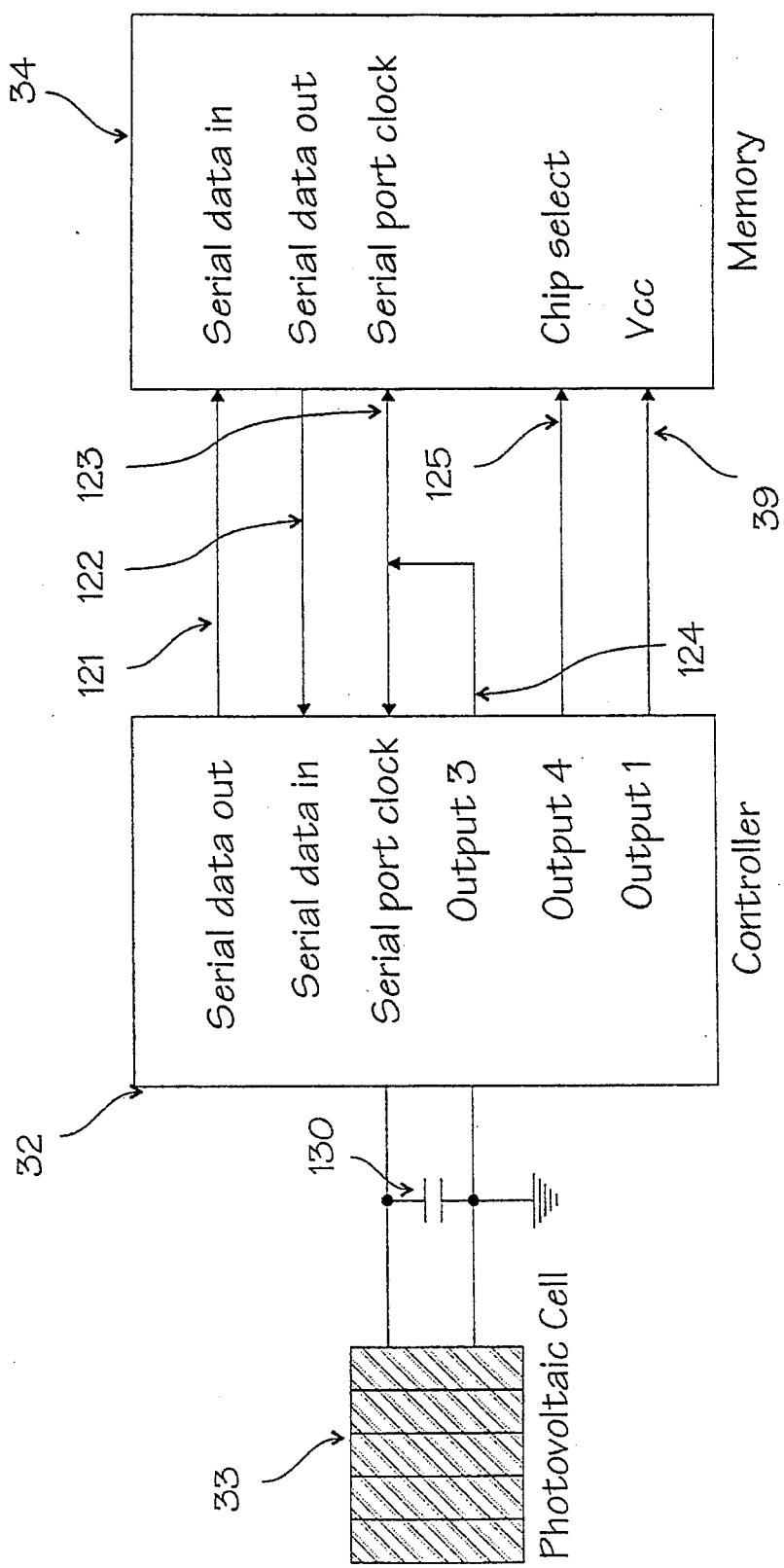
FIG. 13 is a block diagram of the interface between the controller and the memory.

The above describes how the overall power needs of the display unit are satisfied. It is also necessary to consider the case in which the necessary power exceeds the steady-state power available, such as when an obstacle (e.g. a consumer)

blocks some of the incident light to the display unit. Referring to FIG. 13, controller 32 is the only device directly powered by the power supply. Controller 32 acts as an electronic switch that powers the receiver (not shown), the memory 34, or neither. In normal operation, the receiver is powered and the memory 34 is not. Controller 32 assumes a low voltage condition when the software determines that valid bits are not being received. Additionally, a controller may be selected that has a built-in low voltage detection circuit. In either case, controller 32 then removes power from output to line 110 and goes into a "halt" or "sleep" condition for a few seconds. In this condition, the power to the display is maintained, but the total power required drops to less than five per cent of normal. Thus the display may be read by the observer under very dim light as the storage capacitor 130 recharges. Following the "halt" period, controller 32 awakes and resumes operation. This process is repeated until the low voltage (low light) condition no longer is present. Thus, during periods of low light (or blockage) the display is maintained but communication is temporarily lost.

Until lower power memory devices become available, a different power saving method may be used during data exchanges between controller 32 and memory 34. The best memory available today is a relatively high power semiconductor. It requires ten or more times the steady state power available from the power supply used in this invention. At the clock frequency used to lower the on-going power demands of controller 32, as explained above, the data exchange would require capacitor 130 to be unreasonably large to effect a complete exchange with stored charge alone. Instead, the data exchange is broken up into several smaller actions, with pauses in between them to allow storage capacitor 130 to recharge. This procedure continues until the data exchange has been completed and verified. Controller 32 and memory 34 each have a compatible three wire serial port 120.

THE CONTROLLER-MEMORY INTERFACE

Referring to FIG. 13, serial data moves from controller 32 to memory 34 via line 121, or from memory 34 to controller 32 via line 122 every time the clock on line 123 is pulsed by output 3 of controller 32 on line 124, provided the memory has been activated (selected) via a signal from output 4 on line 125. This clock is not the same as the clock applied to the oscillator of controller 32, but is generated by controller 32 in software and supplied through output 3 on line 124. Since both serial ports are used in the slave mode, the software can control the rate and number of bits exchanged at one time. That number of bits is an integral number which preferably is evenly divisible into the total number of bits to be exchanged. If, for example, thirty-two bits are to be read from memory 34, and capacitor 130 has stored enough charge to accommodate the exchange of only four bits, then controller 32 accomplishes the exchange using the following procedure:

1. Apply power to memory 34 via line 111.
2. Select (activate) memory 34 via chip select line 125.
3. Toggle the serial port clock line 123 four times via a signal on line 124.
4. Place memory 34 into standby mode via a signal on line 125.
5. Place the controller 32 into the halt mode by a software command.
6. Capacitor 130 charges back up.
7. Controller 32 "wakes up" and repeats this process from Step 2 through Step 6 seven more times for the rest of the thirty-two bits.
8. With all thirty-two bits exchanged, power is removed from memory 34 on line 111 (FIG. 6).
9. Return to normal operation.

This technique requires very little power dissipation overall, permitting the display units of the invention to be powered by solar power only without battery back-up. This has the advantages described earlier.

As will be understood by those skilled in the art, many changes in the apparatus and methods described above may be made by the skilled practitioner without departing from the spirit and scope of the invention, which should be limited only as set forth in the claims which follow.

What is claimed is:

1. An electronic display unit for electronically displaying item data associated with it, said data being provided in updatable form by a computer, said display unit comprising:

a receiver including a detector, and amplifier and a comparator, for receiving and comparing data transmitted by said computer;

a non-volatile semiconductor memory coupled to said receiver for storing its own address along with the data provided by said computer, for retaining such data even in the absence of external power and for providing said address to said receiver for comparison to the received data;

a display coupled to said non-volatile memory for displaying said data;

a controller coupled to said receiver which receives a signal from said receiver when the address stored in said non-volatile memory is contained within a message received from said computer and if so, changes the displayed information to the extent indicated by said message;

a photovoltaic power supply which supplies adequate power for the entire display unit without need for battery backup; and an electronic switch coupled between said power supply, said receiver and said memory for selectively providing power either to said memory, to said receiver, or to neither of them depending upon the amount of power available from said power supply.

2. An electronic display unit for electronically displaying item data provided in updatable form by a computer, said display unit comprising:

a receiver including a detector, an amplifier and a comparator for receiving the item data transmitted by said computer;

a non-volatile semiconductor memory coupled to said receiver for storing its own address along with the item data provided by said computer, and for retaining such item data even in the absence of external power;

a display coupled to said non-volatile memory for displaying said item data;

said comparator being adapted to determine if the address stored in said non-volatile memory is contained within a message received from said computer;

a photovoltaic power supply which supplies adequate power to the entire display unit without need for battery backup; and a controller for controlling the transfer of item data between said receiver and said non-volatile memory, for changing the displayed information to the extent indicated by said message, and for providing a plurality of partial transfers of said item data when power is insufficient for a complete transfer, until all of said data has been transferred.

3. The display unit of claim 2 wherein said partial transfers pass an integral number of bits of data, said integral number being less than the total number of bits in the message to be transferred.

4. The display unit of claim 3 wherein said integral number is evenly divisible into the total number of bits of data in the message to be transferred.

* * * * *